United States Patent
Zhou et al.

(10) Patent No.: US 10,920,094 B2
(45) Date of Patent: Feb. 16, 2021

(54) REACTIVE POLYURETHANE DISPERSIONS

(71) Applicant: Hewlett-Packard Development Company, L.P., Spring, TX (US)

(72) Inventors: Zhang-Lin Zhou, San Diego, CA (US); Rodney David Stramel, San Diego, CA (US); Qianhan Yang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 84 days.

(21) Appl. No.: 16/335,460

(22) PCT Filed: Jan. 31, 2017

(86) PCT No.: PCT/US2017/015764
§ 371 (c)(1),
(2) Date: Mar. 21, 2019

(87) PCT Pub. No.: WO2018/143920
PCT Pub. Date: Aug. 9, 2018

(65) Prior Publication Data
US 2019/0218404 A1  Jul. 18, 2019

(51) Int. Cl.
*C09D 175/16* (2006.01)
*C09D 11/101* (2014.01)
(Continued)

(52) U.S. Cl.
CPC ........ *C09D 11/101* (2013.01); *C08G 18/0828* (2013.01); *C08G 18/246* (2013.01);
(Continued)

(58) Field of Classification Search
CPC .............. C09D 175/16; C08G 18/8061; C08G 18/8064; C08G 18/807; C08G 18/808;
(Continued)

(56) References Cited

U.S. PATENT DOCUMENTS 4,145,509 A  3/1979  Bhatia
4,264,757 A  4/1981  Park
(Continued)

FOREIGN PATENT DOCUMENTS

DE  2256806  5/1973
EP  0012370  6/1980
(Continued)

OTHER PUBLICATIONS

FR-2168623_08-1973_English Translation.*
(Continued)

*Primary Examiner* — Michael L Leonard
(74) *Attorney, Agent, or Firm* — Thorpe North & Western LLP

(57) ABSTRACT

The present disclosure is drawn to a reactive polyurethane dispersion including a polymer strand having a polymer backbone that has two ends terminating at a first capping unit and a second capping unit. The polymer backbone can include polymerized monomers including a reactive diol and a diisocyanate. The reactive diol can be an acrylate-containing diol, a methacrylate-containing diol, a styrene-containing diol, or combination thereof. The first capping unit can be a styrene-containing monoalcohol reacted with an isocyanate group of the diisocyanate. The second capping unit can be an ionic stabilizing group.

20 Claims, 2 Drawing Sheets

(51) Int. Cl.

| | | |
|---|---|---|
| *C09D 11/30* | (2014.01) | |
| *C08G 18/75* | (2006.01) | |
| *C08G 18/38* | (2006.01) | |
| *C08G 18/24* | (2006.01) | |
| *C08G 18/81* | (2006.01) | |
| *C08G 18/08* | (2006.01) | |
| *C08G 18/67* | (2006.01) | |
| *C08G 18/80* | (2006.01) | |
| *C09D 11/102* | (2014.01) | |

(52) U.S. Cl.
CPC ....... *C08G 18/3857* (2013.01); *C08G 18/675* (2013.01); *C08G 18/6705* (2013.01); *C08G 18/6715* (2013.01); *C08G 18/755* (2013.01); *C08G 18/758* (2013.01); *C08G 18/807* (2013.01); *C08G 18/808* (2013.01); *C08G 18/8061* (2013.01); *C08G 18/8064* (2013.01); *C08G 18/8096* (2013.01); *C08G 18/815* (2013.01); *C08G 18/8158* (2013.01); *C08G 18/8166* (2013.01); *C08G 18/8175* (2013.01); *C09D 11/102* (2013.01); *C09D 11/30* (2013.01); *C09D 175/16* (2013.01)

(58) Field of Classification Search
CPC .............. C08G 18/8096; C08G 18/815; C08G 18/8158; C08G 18/8166
See application file for complete search history.

(56) References Cited

U.S. PATENT DOCUMENTS

| | | | |
|---|---|---|---|
| 5,089,586 A * | 2/1992 | Piepho | C08G 18/4833 |
| | | | 528/49 |
| 6,462,127 B1 | 10/2002 | Ingrisch et al. | |
| 7,169,841 B2 | 1/2007 | Schwalm et al. | |
| 7,220,814 B2 | 5/2007 | Rische et al. | |
| 7,943,682 B2 | 5/2011 | Wagner et al. | |
| 7,968,641 B2 | 6/2011 | Killilea | |
| 8,048,937 B2 | 11/2011 | Heischkel et al. | |
| 8,186,822 B2 | 5/2012 | Li et al. | |
| 8,231,976 B2 | 7/2012 | Sommer et al. | |
| 8,398,199 B2 | 3/2013 | Verdonck | |
| 8,722,762 B2 | 5/2014 | Peleshanko | |
| 8,742,010 B2 | 6/2014 | Allen et al. | |
| 9,090,734 B2 | 7/2015 | Kraiter et al. | |
| 9,163,111 B2 | 10/2015 | Van Holen et al. | |
| 2006/0148980 A1 | 7/2006 | Tielemans et al. | |
| 2008/0242757 A1 | 10/2008 | Dvorchak et al. | |
| 2008/0300338 A1 | 12/2008 | Wagner et al. | |
| 2010/0048765 A1 | 2/2010 | Lubnin et al. | |
| 2010/0233431 A1 | 9/2010 | Allen et al. | |
| 2012/0259065 A1 | 10/2012 | Sommer et al. | |
| 2015/0247044 A1 | 9/2015 | Brandstein et al. | |
| 2016/0053124 A1 | 2/2016 | Brandstein et al. | |
| 2016/0304734 A1 | 10/2016 | Feng et al. | |
| 2016/0326389 A1 | 11/2016 | Romanato et al. | |
| 2018/0179325 A1 | 6/2018 | Chen et al. | |

FOREIGN PATENT DOCUMENTS

| | | | | |
|---|---|---|---|---|
| FR | 2168623 A5 * | 8/1973 | ......... | C08G 18/8158 |
| JP | 2011079967 | 4/2011 | | |
| WO | 2013083956 | 6/2013 | | |
| WO | 2015028397 | 3/2015 | | |
| WO | 2015075193 | 5/2015 | | |
| WO | 2015131027 | 9/2015 | | |
| WO | 2016048360 | 3/2016 | | |
| WO | 2016048361 | 3/2016 | | |
| WO | 2016122563 | 8/2016 | | |
| WO | 2016122566 | 8/2016 | | |
| WO | 2016122569 | 8/2016 | | |
| WO | WO-2016122563 A1 * | 8/2016 | ........... | C08G 18/815 |
| WO | WO-2016122566 A1 * | 8/2016 | .............. | C08L 75/16 |
| WO | WO-2016122569 A1 * | 8/2016 | ......... | C08G 18/6245 |
| WO | 2017074349 | 5/2017 | | |

OTHER PUBLICATIONS

International Search Report dated Oct. 19, 2017 for PCT/US2017/015764, Applicant Hewlett-Packard Development Company, L.P.

* cited by examiner

REACTIVE POLYURETHANE DISPERSIONS

BACKGROUND

Radiation curable compositions, such as ultraviolet (UV) curable compositions, can become highly durable solids upon curing. UV-curable polyurethane, for example, has been used in applications such as paints, floor finishes, aircraft coatings, industrial coatings, and so on. UV-curable polyurethane coatings can be applied in liquid form and then cured very quickly using UV radiation to produce a hard, durable cross-linked coating.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
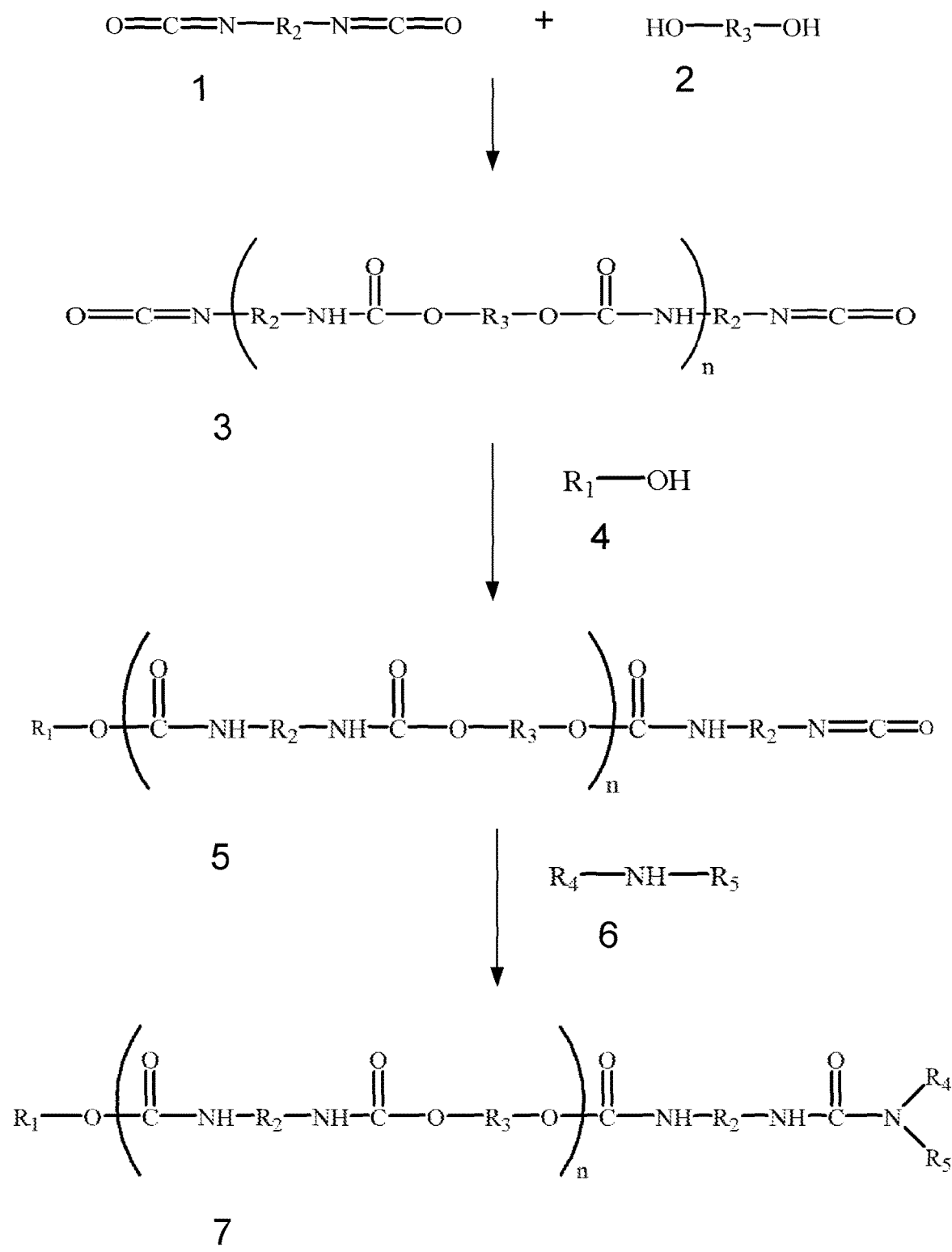
FIG. 1 is an example reaction scheme showing a reaction pathway for forming a polymer strand of a reactive polyurethane dispersion in accordance with the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to reactive polyurethane dispersions. These reactive polyurethane dispersions can be used in UV-curable water-based inkjet inks. Generally, UV-curable inkjet inks can include water, a colorant, a photoinitiator, and a reactive component such as monomers or reactive polymers that can polymerize or cross-link upon exposure to UV radiation. The polyurethane dispersions described herein can include reactive groups such as acrylate, methacrylate, and styrene groups that can cross-link the polyurethane when the UV-curable ink is exposed to UV radiation.

In further detail, the reactive polyurethane dispersions described herein can include polymer strands with styrene reactive groups in capping units at the ends of the strands. In some examples, a reactive polyurethane dispersion can include a polymer strand that has a polymer backbone having two ends terminating at a first capping unit and a second capping unit. The polymer backbone can be formed of polymerized monomers including: a reactive diol selected from an acrylate-containing diol, a methacrylate-containing diol, a styrene-containing diol, or combination thereof; and a diisocyanate. The first capping unit can be a styrene-containing monoalcohol reacted with an isocyanate group of the diisocyanate. The second capping unit can be an ionic stabilizing group. In one example, the polymer backbone can be devoid of ionic stabilizing groups. In another example, the reactive polyurethane dispersion can have an NCO/OH ratio of 1.2 to 10, an acid number of 20 to 100, and/or a double bond density of 1.5 to 10. In further detail, the reactive polyurethane dispersion can be devoid of polymer strands having capping units that include acrylate groups or methacrylate groups. In still other examples, a majority of polymer strands in the reactive polyurethane dispersion can have a first capping unit that is a styrene-containing monoalcohol reacted with an isocyanate group of the diisocyanate and a second capping unit that is an ionic stabilizing group. In one example, the reactive diol can be selected from Formulas IV to IX, or a combination thereof, as shown hereinafter. In another example, the styrene-containing monoalcohol can be selected from Formulas XVI to XX, or a combination thereof, also as shown hereinafter.

The reactive polyurethane dispersion can be used in a UV-curable ink composition as well. The UV-curable ink composition can include a colorant, a photoinitiator, and a reactive polyurethane dispersion. The reactive polyurethane dispersion can include a polymer strand that has a polymer backbone having two ends terminating at a first capping unit and a second capping unit. The polymer backbone can be formed of polymerized monomers including: a reactive diol selected from an acrylate-containing diol, a methacrylate-containing diol, a styrene-containing diol, or combination thereof; and a diisocyanate. The first capping unit can be a styrene-containing monoalcohol reacted with an isocyanate group of the diisocyanate. The second capping unit can be an ionic stabilizing group. In one specific example, the UV-curable ink composition can have a pH of 7.0 to 11.5 and/or the pH does not decrease by more than 1.0 when the UV-curable ink composition is exposed to accelerated shelf-life (ASL) at 50° C. in open air for 1 week. In other examples, the polymer backbone can be devoid of ionic stabilizing groups.

In a further example, a method of making a reactive polyurethane dispersion can include reacting a diisocyanate with a reactive diol selected from an acrylate-containing diol, a methacrylate-containing diol, a styrene-containing diol, or combination thereof, to form a first pre-polymer. The first pre-polymer can be reacted with a styrene-containing monoalcohol to form a second pre-polymer. The second pre-polymer can then be reacted with an acid-containing amine to form a polymer strand. The polymer strand can be dispersed in water to form the reactive polyurethane dispersion. In one example, the method can include adding a colorant and a photoinitiator to the reactive polyurethane dispersion to form a UV-curable ink composition.

The reactive polyurethane dispersions described herein can be pH-stable in inkjet ink compositions. Inkjet inks are often basic, having a pH in the range of about 7.0 to about 11.5. Acrylate monomers are often used in reactive polyurethanes, but the acrylate groups are easily hydrolyzed under the basic conditions of inkjet ink. This results in a drop in the pH of the ink over time. The drop in pH of the inkjet can result in problems with the ink, such as causing dispersed pigments to crash out of dispersion making the ink unjettable. The reactive polyurethane dispersions described herein can overcome these challenges because the reactive polyurethane dispersions can have a stable pH over time, while also being curable by UV radiation to provide a durable printed image.

As used herein, "pH-stable" means a composition that changes less than 1 pH unit after two weeks in accelerated shelf-life (ASL) conditions. ASL refers to an experimental test designed to test the shelf-life of a composition in an accelerated time frame. ASL tests referred to herein are performed by placing a composition in a container open to air at a temperature of 50° C. It is assumed that each week under these conditions simulates six months of shelf-life time under normal storage conditions.

Many commercially available reactive pH dispersions are intended for UV-curable coating applications. Commercially available reactive pH dispersions include dispersions sold under the names Ucecoat®6558, Ucecoat®6559, Ebecryl®2002 and Ebecryl®2003 (available from Cytec). Other representative acrylated CPUDs include Ucecoat®7710, Ucecoat®7655 (available from Cytec), Neorad® R440, Neorad® R441, Neorad® R447, Neorad® R448 (available from DSM NeoResins), Bayhydrol® UV 2317, Bayhydrol® UV VP LS 2348 (available from Bayer), Lux®430, Lux®399, Lux®484 (available from Alberdingk Boley), Laromer® LR8949, Laromer® LR8983, Laromer® PE22WN, Laromer® PE55WN, Laromer® UA9060 (available from BASF). Under basic aqueous conditions, these commercially available dispersions hydrolyze easily and produce more than one or two units of pH drop after 1 week ASL.

The reactive polyurethane dispersions described herein include particular combinations of functional groups in the polymer backbone and capping units of the polyurethane polymer strands in the dispersions. These combinations of functional groups and their placement in the polymer strands can improve the pH-stability of the dispersions. Thus, the present reactive polyurethane dispersions can overcome the pH-stability limitations of commercially available polyurethane dispersions when used in basic aqueous inks. In some examples, the present reactive polyurethane dispersions do not exhibit the large pH drop under basic aqueous conditions that occurs with the commercially available polyurethane dispersions mentioned above.

To clarify the structure of polymer strands in the reactive polyurethane dispersion, Formula (I) shows one example of a general chemical structure of a polymer strand in the polyurethane dispersion:

In Formula (I), $R_1$, $R_2$, $R_3$, $R_4$, and $R_5$ can correspond to the following groups: $R_1$ can be an organic group that includes a styrene functional group; $R_2$ can be an organic group; $R_3$ can be an organic group containing an acrylate, methacrylate, or styrene functional group; $R_4$ can be an ionic stabilizing group; and $R_5$ can be hydrogen or an additional organic group. The term "organic group" can generally refer to carbon-containing groups with from 1 to 20 carbon atoms, and can be straight chained, branched, alicyclic, aromatic, etc. Organic groups can be substituted with O, S, P, N, B, etc. Additionally, n can be any integer, for example from 1 to 1,000. The polymer strand includes capping units that include groups $R_1$, $R_4$, and $R_5$ with a polymer backbone between the capping units. As is common with polyurethane polymers, in some examples the polymer backbone can be formed by polymerizing a diisocyanate and a diol. The polymer backbone shown in Formula (I) can be formed by reacting a diisocyanate having Formula (II) with a diol having Formula (III):

$$O=C=N-R_2-N=C=O \qquad (II)$$

$$HO-R_3-OH \qquad (III)$$

The diisocyanate and diol can polymerize to form a polymer backbone of alternating polymerized diisocyanate and diol groups. The capping units can be added at each end of the polymer backbone by introducing a monofunctional monomer that includes the groups $R_1$ or $R_4$ and $R_5$. In various examples, the monofunctional monomer can be a monoalcohol or monoamine that reacts with the unreacted isocyanate groups of the diisocyanate monomers at the ends of the polymer backbone. In certain examples, the polymer strand can include different capping units at each end of the polymer strand. This is shown in Formula (I). However, in other examples, the polymer strand can have two identical capping units.

In some examples, the polymer strands of the reactive polyurethane dispersion can include a polymer backbone including polymerized monomers. The polymerized monomers in the polymer backbone can include a reactive diol and a diisocyanate. In certain examples, the reactive diol can be selected from an acrylate-containing diol, a methacrylate-containing diol, a styrene-containing diol, or combination thereof. As used herein, "acrylate-containing diol" refers to a chemical compound that has two hydroxyl groups and an acrylate functional group. Similarly, "methacrylate-containing diols" and "styrene-containing diols" refer to diol compounds that include methacrylate and styrene functional groups, respectively.

These reactive diols can polymerize with the diisocyanate to form the polymer backbone. In the polymerizing process, an oxygen atom in a hydroxyl group of the reactive diol forms a bond with a carbon atom in an isocyanate group of the diisocyanate. This is commonly referred to as a urethane linkage. By this process, a polymer backbone forms as a chain of alternating polymerized diisocyanate and reactive diol monomers. As used herein, "polymerized monomer" is

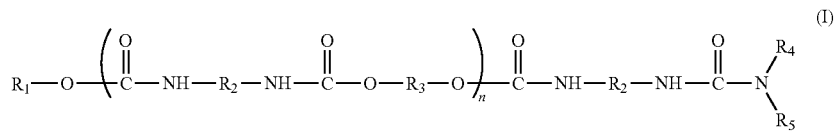

used to describe monomers in their polymerized state, e.g., after the monomers have bonded together to form a polymer chain. The names of monomers in their original state may be used even though it is understood that the monomers change in certain ways during polymerizing. For example, "polymerized diisocyanate and reactive diol" can refer to a polymer chain formed by polymerizing a diisocyanate and a reactive diol, even though the diisocyanate and reactive diol do not actually exist as separate molecules in the polymer. In the case of polymerized diisocyanates and reactive diols, a hydrogen atom of the hydroxyl group of the reactive diol is replaced by a bond between the oxygen atom of the hydroxyl group and the carbon atom of the isocyanate group of the diisocyanate. Thus, the reactive diol is no longer a reactive diol, but has become a portion of a polymer chain. However, "polymerized reactive diol" may still be used to refer to this portion of the polymer chain for the sake of convenience.

Accordingly, in some examples the reactive polyurethane dispersion can include a polymer strand having a polymer backbone including polymerized diisocyanate and reactive diol. The reactive diol can be an acrylate-containing diol, a methacrylate-containing diol, a styrene-containing diol, or combination thereof. In examples where multiple types of reactive diol are included, the polymer backbone resulting from polymerizing the monomers can be made up of alternating diisocyanate and diol units, where each of the diol units can be one of the multiple types of reactive diols that were included in the polymerization reaction. In some examples, all or substantially all of the diol units in the polymer backbone can be an acrylate-containing diol, a methacrylate-containing diol, or a styrene-containing diol. In alternate examples, a non-reactive diol can also be included in the polymer backbone. In still further examples, other polyols can be included having more than two hydroxyl groups in each polyol molecule.

In certain examples, the reactive diol polymerized in the polymer backbone can be selected from the following reactive diols:

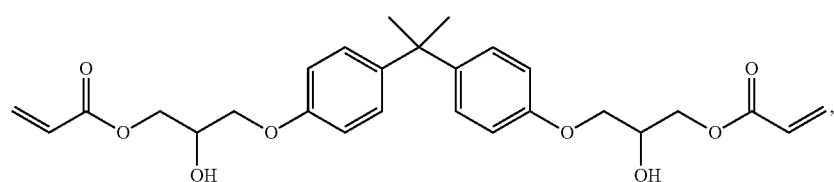

(IV)

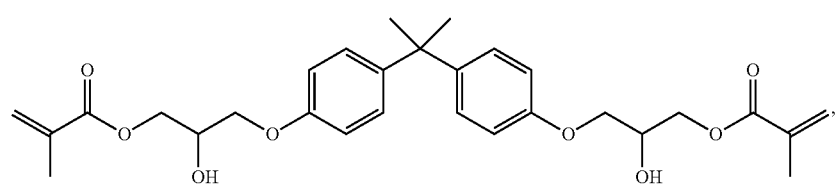

(V)

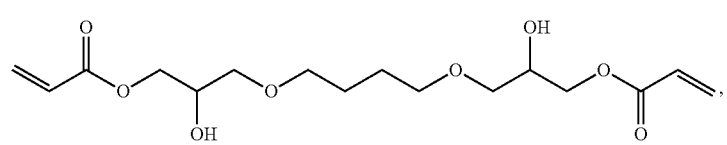

(VI)

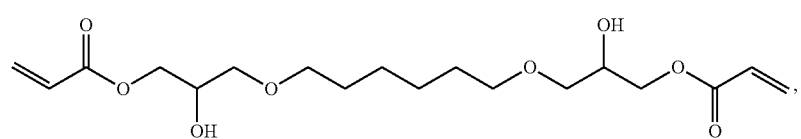

(VII)

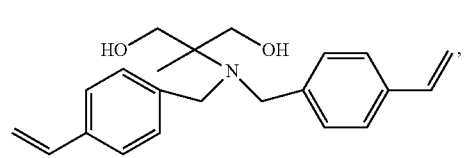

(VIII)

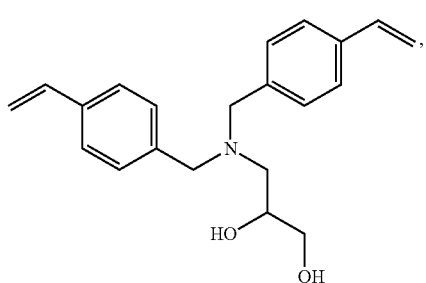

(IX)

The portions of the polymer chain formed from diisocyanates or diols can also be referred to as "diisocyanate units" and "diol units" for convenience.

or a combination thereof.

An example of a synthesis reaction for forming a styrene-containing diol is shown in Scheme 1:

Scheme 1

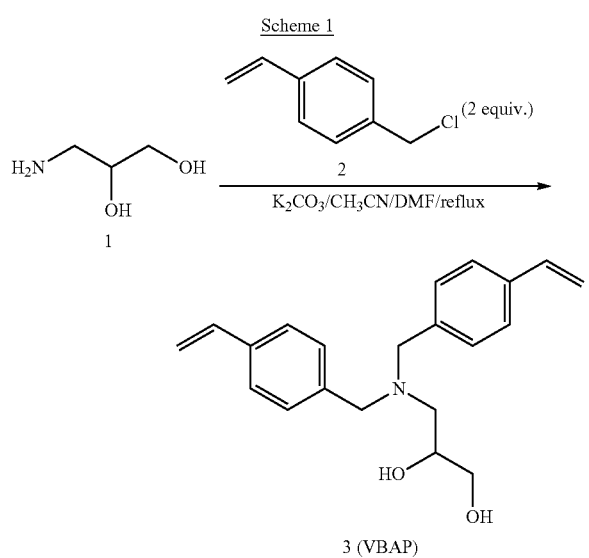

3 (VBAP)

As shown in Scheme 1, a styrene-containing diol (3) (3-[di-(4-vinylbenzyl)amino]-1,2-propanediol or VBAP) can be synthesized by reacting 4-vinylbenzyl chloride (2) with 3-amino-1,2-propanediol (1) in the presence of potassium carbonate in acetonitrile and DMF under reflux.

Another example of a synthesis reaction for forming a styrene-containing diol is shown in Scheme 2:

Scheme 2

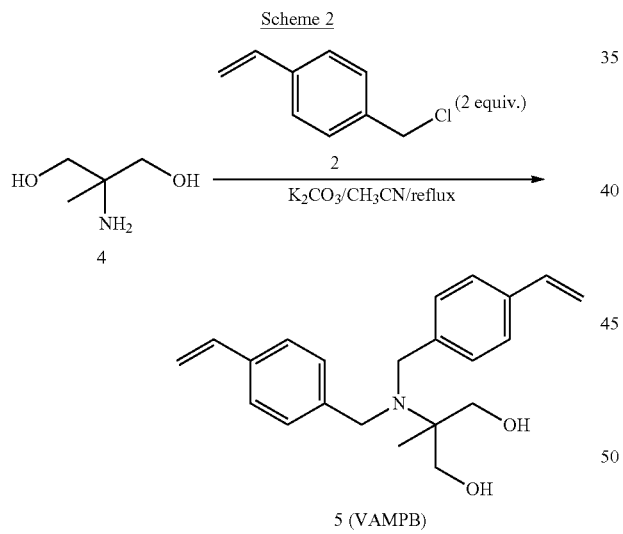

5 (VAMPB)

As shown in Scheme 2, a styrene-containing diol (5) (2-[di-(4-vinylbenzyl)amino-2-methylpropane-1,3-diol or VAMPB) was synthesized by reacting 4-vinylbenzyl chloride (2) with 2-amino-2-methyl-1,3-propanediol (4) in the presence of potassium carbonate in acetonitrile under reflux.

The reactive diol can include reactive functional groups that can participate in UV-curing. Acrylate groups, methacrylate groups, and styrene groups can each participate in UV-curing through the double bonds in each of these functional groups. Thus, when the reactive polyurethane dispersion is cured, the double bonds in the acrylate, methacrylate, and/or styrene groups can link together to form crosslinking between polymer strands.

The diisocyanate polymerized in the polymer backbone is not particularly limited. Generally, the diisocyanate is a molecule having two isocyanate groups that can react with the hydroxyl groups of the reactive diol to form urethane linkages. In some examples, the diisocyanate used in the polymer backbone can be non-reactive. That is, the diisocyanate can be devoid of reactive functional groups other than the isocyanate groups. For example, the diisocyanate can be devoid of acrylate, methacrylate, acrylamide, allyl, styrene, and other functional groups that can participate in UV-curing. In alternate examples, the diisocyanate can include one or more of such functional groups.

In certain examples, the diisocyanate polymerized in the polymer backbone can be selected from the following diisocyanates:

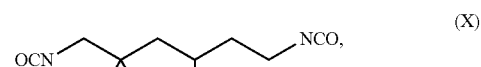 (X)

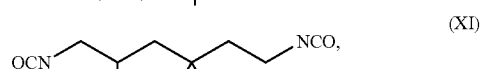 (XI)

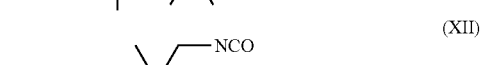 (XII)

 (XIII)

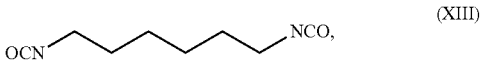 (XIV)

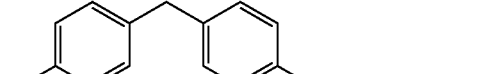 (XV)

or a combination thereof.

Capping units can be added to the polymer backbone by polymerizing a monofunctional monomer with the isocyanate groups at the terminal ends of the polymer backbone. In some examples of the reactive polyurethane dispersion described herein, two distinct capping units can be included in the polymer strands. In certain examples, a polymer strand can have a first capping unit at one end of the polymer backbone, and a second capping unit at the other end of the polymer backbone. The first capping unit can be a styrene-containing monoalcohol reacted with an isocyanate group of the diisocyanate of the polymer backbone. The second capping unit can be an ionic stabilizing group.

As used herein, "ionic stabilizing group" refers to an organic group that includes an acidic functional group or other ionic functional group that can stabilize the dispersion of the polyurethane in water. Acidic stabilizing groups can include organic acid functional groups (i.e., carboxyls), sulfonic acid groups, and other acidic functional groups. In some examples, a capping unit including an ionic stabilizing group can be an amino acid. In further examples, a capping unit including an ionic stabilizing group can be taurine.

In further examples, the styrene-containing monoalcohol reacted with the an isocyanate group of the polymer backbone to form the capping unit can be selected from the following molecules:

(XVI)
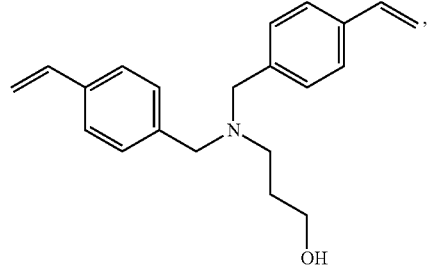

(XVII)
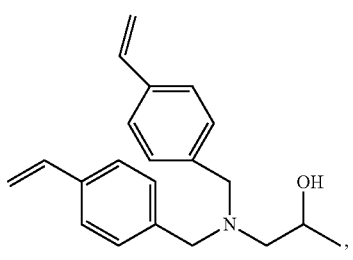

(XVIII)
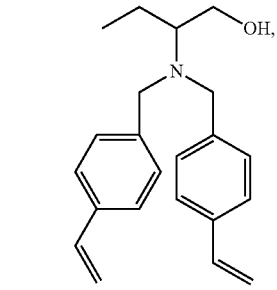

(XIX)
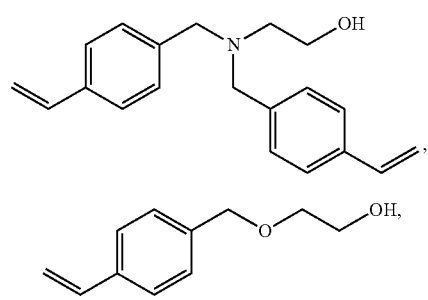

(XX)
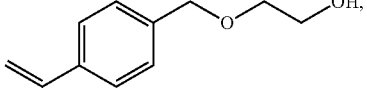

or a combination thereof.

An example of a synthesis reaction for forming a styrene-containing monoalcohol is shown in Scheme 3:

Scheme 3
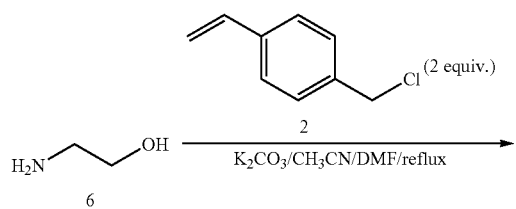

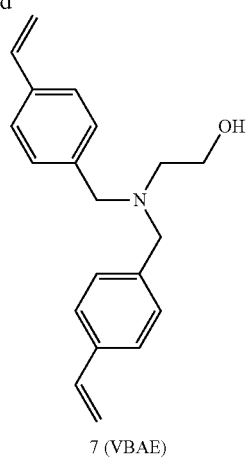

7 (VBAE)

As shown in Scheme 3, a styrene-containing monoalcohol (7) (2-[di-(4-vinylbenzylamino)]ethanol or VBAE) can be synthesized by reacting 4-vinylbenzyl chloride (2) with ethanolamine (6) in the presence of potassium carbonate in acetonitrile under reflux.

Another example of a synthesis reaction for forming a styrene-containing monoalcohol is shown in Scheme 4:

Scheme 4
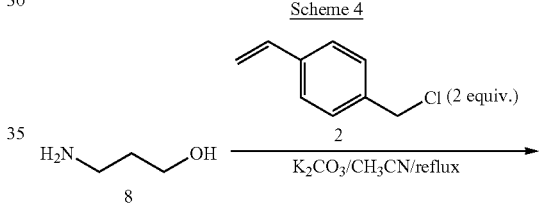

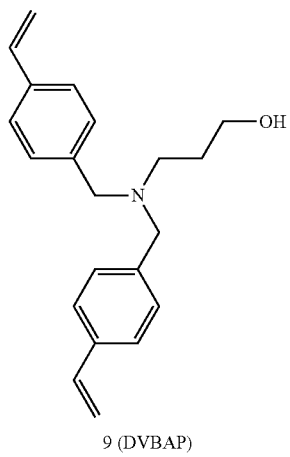

9 (DVBAP)

As shown in Scheme 4, a styrene-containing monoalcohol (9) (3-[di-(4-vinylbenzylamino)]propanol or DVBAP) can be synthesized by reacting 4-vinylbenzyl chloride (2) with 3-aminopropanol (8) in the presence of potassium carbonate in acetonitrile under reflux.

An additional example of a synthesis reaction for forming a styrene-containing monoalcohol is shown in Scheme 5:

Scheme 5

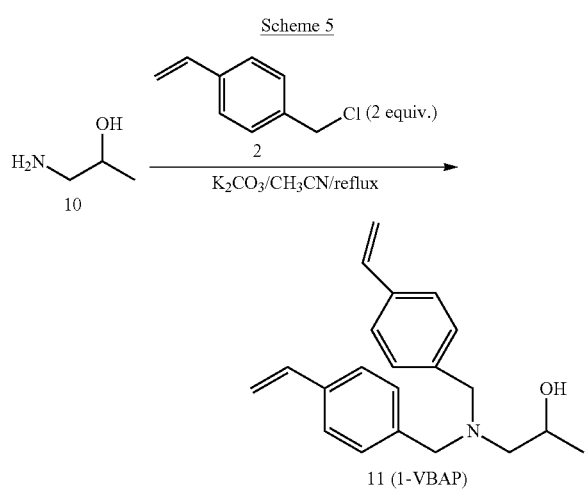

11 (1-VBAP)

As shown in Scheme 5, a styrene-containing monoalcohol (11) (1-[di-(4-vinylbenzylamino)]-2-propanol or 1-VBAP) can be synthesized by reacting 4-vinylbenzyl chloride (2) with 1-amino-2-propanol (10) in the presence of potassium carbonate in acetonitrile under reflux.

The hydroxyl group of the styrene-containing monoalcohol can react with the isocyanate group of the polymer backbone to bond the styrene-containing monoalcohol to the polymer backbone. The styrene group can be available to participate in UV-curing of the polyurethane dispersion.

In some examples, the reactive polyurethane dispersion can include a mixture of polymer strands having different combinations of capping groups. In particular, some polymer strands may have a styrene-containing monoalcohol bonded to the polymer backbone at one end, and an ionic stabilizing group bonded to the polymer backbone at the other end. Other polymer strands may have a styrene-containing monoalcohol bonded to both ends of the polymer backbone. Still other polymer strands can have an ionic stabilizing group bonded to both ends of the polymer backbone. In one example, the reactive polyurethane dispersion can include a majority of polymer strands with a styrene-containing monoalcohol bonded to one end of the polymer backbone and an ionic stabilizing group bonded to the other end of the polymer backbone. These polymer strands can have the advantage of improved dispersion stability due to the ionic stabilizing group and the advantage of the styrene group in the capping unit participating in UV-curing to increase the durability of the cured polyurethane. The reactive polyurethane dispersion can also include smaller amounts of polymer strands having styrene-containing capping units at both ends and polymer strands having ionic stabilizing groups at both ends. In one example, more than 50% of the polymer strands in the reactive polyurethane dispersion can have the styrene-containing monoalcohol at one end and the ionic stabilizing group at the other end.

In some examples, the reactive polyurethane dispersion can be more pH-stable when particular types of monomers are included or not included in the polymer backbone and the capping units. In one example, the capping units in the reactive polyurethane dispersion can be free of acrylate and methacrylate groups. The capping units can include styrene groups, as mentioned above. In this example, the polymer backbone can include acrylate, methacrylate, and/or styrene groups. In another example, the polymer backbone can be free of ionic stabilizing groups. In particular, the polymer backbone can be devoid of monomers that contain acidic functional groups. In this example, the reactive polyurethane dispersion can include ionic stabilizing groups in the capping units, but not on the polymer backbone. In a specific example, the polymer backbone can be devoid of carboxylate and sulfonate groups.

In further examples, the reactive polyurethane dispersion can have a NCO/OH ratio of 1.2 to 10. In another example, the reactive polyurethane dispersion can have a NCO/OH ratio of 2 to 3. As used herein, "NCO/OH ratio" refers to the mole ratio of NCO groups to OH groups in the monomers that react to form the polymer backbone.

In still further examples, the reactive polyurethane dispersion can have a double bond density of 1.5 to 10. In other examples, the reactive polyurethane dispersion can have a double bond density of 2 to 10, 3 to 10, or 4 to 10. As used herein, "double bond density" refers to the number of millimoles of double bonds in 1 g of the polyurethane polymer by dry weight.

The reactive polyurethane dispersions described herein can have an acid number from 20 to 100. In further examples, the reactive polyurethane dispersion can have an acid number from 25 to 80, from 30 to 60, or from 35 to 50. As used herein, "acid number" refers to the number of milligrams of potassium hydroxide required to neutralize one gram of the polyurethane dispersion, by solid weight.

In some examples, the reactive polyurethane dispersions can have a minimum film-forming temperature from −50° C. to 80° C. In further examples, the reactive polyurethane dispersions can have a minimum film-forming temperature from −30° C. to 60° C. or from −25° C. to 50° C.

The molecular weight of the polyurethane can also be controlled. In some examples, the reactive polyurethane dispersion can have a weight average molecular weight $M_w$ from 1,000 to 50,000. In further examples, the reactive polyurethane dispersion can have a $M_w$ from 2,000 to 25,000 or from 3,000 to 10,000.

The reactive polyurethane dispersions can be incorporated into UV-curable ink compositions. In some examples, a UV-curable ink composition can include a colorant, a photoinitiator, and a reactive polyurethane dispersion as described herein. In one example, the reactive polyurethane dispersion can include a polymer strand that has a polymer backbone terminating at a first capping unit and a second capping unit at two ends of the polymer backbone. The polymer backbone can include polymerized monomers such as a reactive diol and a diisocyanate. The reactive diol can be selected from an acrylate-containing diol, a methacrylate-containing diol, a styrene-containing diol, or combination thereof. The first capping unit can be a styrene-containing monoalcohol reacted with an isocyanate group of the diisocyanate. The second capping unit can be an ionic stabilizing group.

In some examples, the UV-curable ink composition can be a basic aqueous ink. In one example, the UV-curable ink composition can have a pH of 7.0 to 11.5. In further examples, the UV-curable ink composition can have a pH of 7.5 to 10.5 or 8.0 to 9.0. The reactive polyurethane dispersion in the UV-curable ink composition can be pH stable at these conditions, meaning that the pH of the UV-curable ink composition stays nearly constant over time. In one example, the pH of the UV-curable ink composition can be sufficiently stable that the pH does not decrease by more than 1.0 when the UV-curable ink composition is exposed to accelerated shelf-life (ASL) at 50° C. in open air for 1 week. Each week of ASL is assumed to correspond to six months of shelf-life under normal storage conditions. In a further example, the pH-stability of the UV-curable ink composition may be improved by using a polymer backbone that is devoid of ionic stabilizing groups in the reactive polyurethane dispersion.

The UV-curable ink composition can also include a photoinitiator. The photoinitiator can be a material that generates radicals during UV-curing. Radicals produced by the photoinitiator upon exposure to UV radiation can initiate bonding between the reactive groups in the reactive polyurethane dispersion. In some examples, the photoinitiator can be a type I photoinitiator, which is a unimolecular photoinitiator that generates radicals upon absorption of UV radiation. In further examples, the photoinitiator can be a type II photoinitiator, which can be used together with a synergist to generate radicals by hydrogen abstraction from the synergist. Non-limiting examples of photoinitiators that can be used in the UV-curable ink composition can include 1-hydroxy-cyclohexylphenylketone, benzophenone, 2,4,6-trimethylbenzo-phenone, 4-methylbenzophenone, diphenyl-(2,4,6-trimethylbenzoyl)phosphine oxide, phenyl bis(2,4,6trimethylbenzoyl)phosphine oxide, 2-hydroxy-2-methyl-1-phenyl-1-propanone, benzyl-dimethyl ketal, 2-methyl-I-[4-(methylthio)phenyl]-2-morpholinopropan-I-one, or combinations thereof. Non-limiting examples of additional photo initiators include alpha amino ketone UV photo initiators such as Ciba® Irgacure® 907, Ciba® Irgacure® 369, and Ciba® Irgacure® 379; bis acylphosphine oxide (BAPO) UV photo initiators such as Ciba® Irgacure® 819, Ciba® Darocur® 4265, and Ciba® Darocur® TPO; alpha hydroxy ketone UV photo initiators such as Ciba® Irgacure® 184 and Ciba® Darocur® 1173; including photo initiators with or without sensitizers such as Ciba® Darocur® ITX (2-isopropyl thioxanthone). In some examples, the photoinitiator can be water-soluble or water-dispersible.

In a particular example, the photoinitiator can have the general formula:

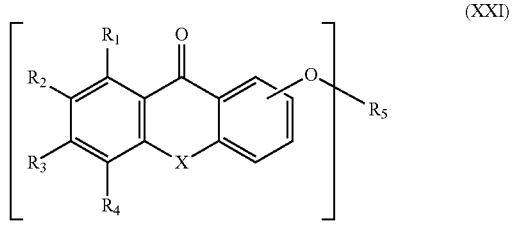

(XXI)

where $R_1$ to $R_4$ are independently a hydrogen atom, an unsubstituted alkyl, a substituted alkyl, an unsubstituted alkenyl, a substituted alkenyl, an unsubstituted aryl, a substituted aryl, an unsubstituted aralkyl, a substituted aralkyl, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$, or a perfluoroalkyl group. $R_d$, $R_e$, and $R_f$ are independently a hydrogen atom, an unsubstituted alkyl, a substituted alkyl, an unsubstituted alkenyl, a substituted alkenyl, an unsubstituted aryl, a substituted aryl, an unsubstituted aralkyl, or a substituted aralkyl. X is selected from $-O-$, $-S-$, $-NH-$, and $-NR-$, where R is selected from $CH_3$, $CH_2CH_3$, and $CH_2CH_2CH_3$. $R_5$ can be an organic group that includes a polyether chain.

In another particular example, the photoinitiator can have the general formula:

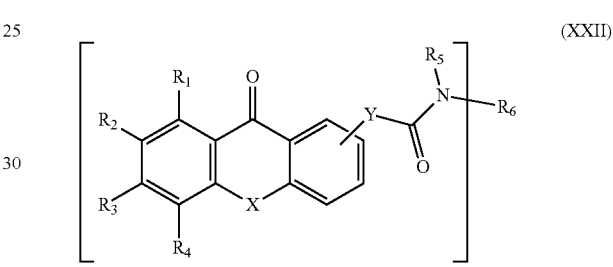

(XXII)

where $R_1$ to $R_5$ are independently a hydrogen atom, an unsubstituted alkyl, a substituted alkyl, an unsubstituted alkenyl, a substituted alkenyl, an unsubstituted aryl, a substituted aryl, an unsubstituted aralkyl, a substituted aralkyl, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$, or a perfluoroalkyl group. $R_d$, $R_e$, and $R_f$ are independently a hydrogen atom, an unsubstituted alkyl, a substituted alkyl, an unsubstituted alkenyl, a substituted alkenyl, an unsubstituted aryl, a substituted aryl, an unsubstituted aralkyl, or a substituted aralkyl. X is selected from $-O-$, $-S-$, $-NH-$, and $-NR-$, where R is selected from $CH_3$, $CH_2CH_3$, and $CH_2CH_2CH_3$. Y is selected from a bond, $(CH_2)_q$, and $O(CH_2)_q$, where q is any integer from 1 to 100. $R_6$ can be an organic group that includes a polyether chain.

Synergists can often be amines or alcohols. Non-limiting examples of synergists that can be used can include trimethylamine, triethanolamine, methyldiethanolamine, phenyldiethanolamine, N,N,N',N'-tetra(hydroxylethyl)ethylenediamine, dimethylaminoethyl acrylate, dimethylaminoethyl methacrylate, ethyl dimethylaminobenzoate, or a combination thereof. In some examples, the synergist can be water-soluble or water-dispersible.

In a particular example, the synergist can have a general formula selected from:

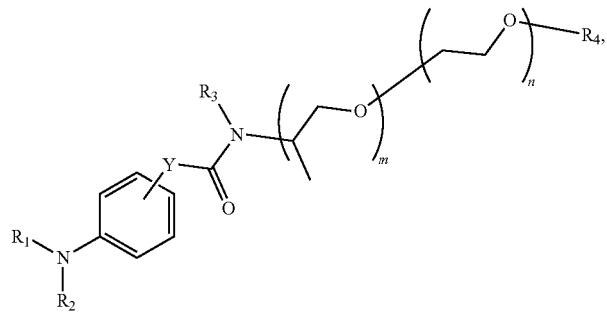

(XXIII)

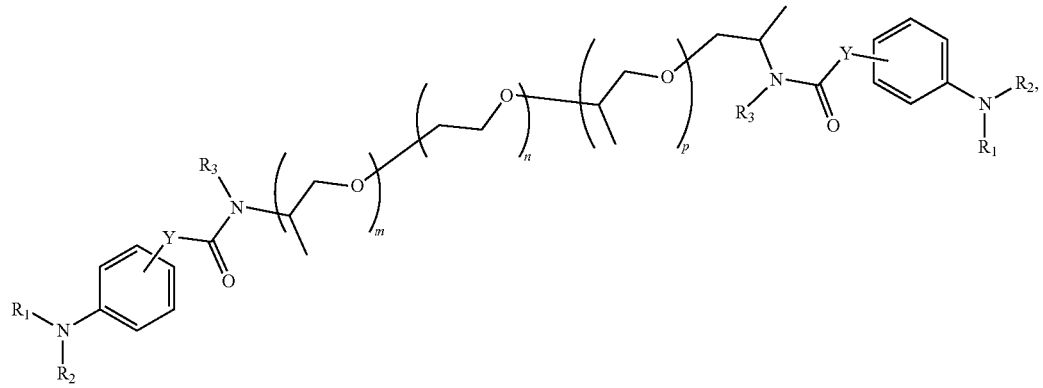

(XXIV)

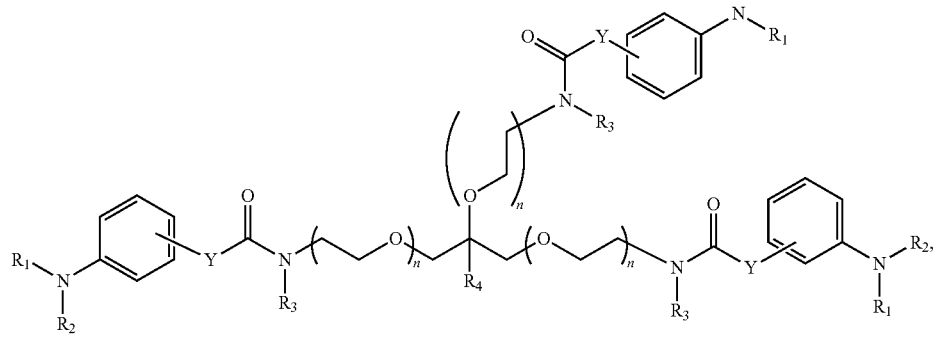

(XXV)

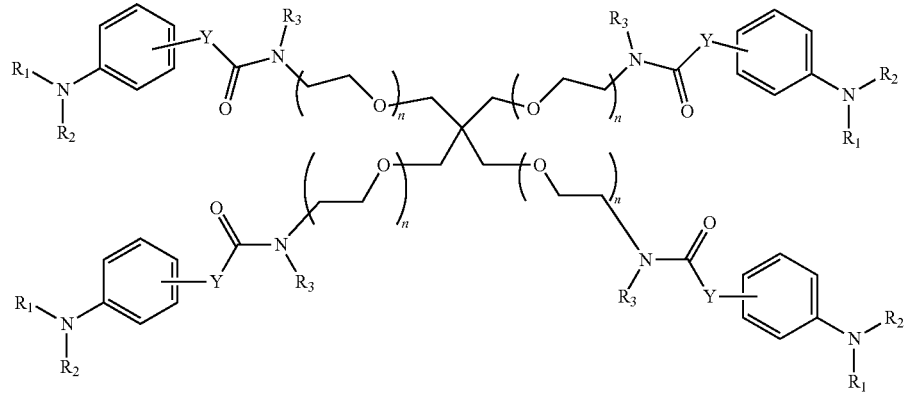

(XXVI)

where $R_1$ to $R_4$ are independently a hydrogen atom, an unsubstituted alkyl, a substituted alkyl, an unsubstituted alkenyl, a substituted alkenyl, an unsubstituted aryl, a substituted aryl, an unsubstituted aralkyl, a substituted aralkyl, a halogen atom, —$NO_2$, —O—$R_d$, —CO—$R_d$, —CO—O—$R_d$, —O—CO—$R_d$, —CO—$NR_dR_e$, —$NR_dR_e$, —$NR_d$—CO—$R_e$, —$NR_d$—CO—O—$R_e$, —$NR_d$—CO—$NR_eR_f$, —$SR_d$, —SO—$R_d$, —$SO_2$—$R_d$, —$SO_2$—O—$R_d$, —$SO_2NR_dR_e$, or a perfluoroalkyl group. $R_d$, $R_e$, and $R_f$ are independently a hydrogen atom, an unsubstituted alkyl, a substituted alkyl, an unsubstituted alkenyl, a substituted alkenyl, an unsubstituted aryl, a substituted aryl, an unsubstituted aralkyl, or a substituted aralkyl. The numbers m, n, and p are independently any integer from 0 to 200, provided that the sum of m, n, and p is at least 5. Y is selected from a bond, $(CH_2)_q$, and $O(CH_2)_q$, where q is any integer from 1 to 100.

The UV-curable ink composition can be curable UV radiation, such as radiation produced by UV light emitting diodes (LEDs), UV fluorescent lamps, UV lasers, UV incandescent lamps, sunlight, and other UV radiation sources.

The colorant in the UV-curable ink composition can be a pigment, a dye, or a combination thereof. In some examples, the colorant can be present in an amount from 0.5 wt % to 10 wt % in the UV-curable ink composition. In one example, the colorant can be present in an amount from 1 wt % to 5 wt %. In another example, the colorant can be present in an amount from 5 wt % to 10 wt %.

In some examples, the colorant can be a dye. The dye can be nonionic, cationic, anionic, or a mixture of nonionic, cationic, and/or anionic dyes. Specific examples of dyes that can be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following black pigments are available from Cabot: Monarch® 1400, Monarch® 1300, Monarch® 1100, Monarch® 1000, Monarch® 900, Monarch® 880, Monarch® 800, and Monarch® 700. The following pigments are available from CIBA: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure® R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the UV-curable ink composition. Additionally, the colorant can include a white pigment such as titanium dioxide, or other inorganic pigments such as zinc oxide and iron oxide.

The components of the UV-curable ink composition can be selected to give the composition good ink jetting performance. Besides the colorant, photoinitiator, and reactive polyurethane dispersion, the UV-curable ink composition can also include a liquid vehicle. Liquid vehicle formulations that can be used in the UV-curable ink composition can include water and one or more co-solvents present in total at from 1 wt % to 50 wt %, depending on the jetting architecture. Further, one or more non-ionic, cationic, and/or anionic surfactant can be present, ranging from 0.01 wt % to 20 wt % (if present). In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, and the like. In one example, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

In some examples, the UV-curable ink composition can include one or more curable solvents that can participate in UV-curing with the reactive polyurethane dispersion. Non-limiting examples of curable solvents that can be used can include hydroyethylacrylamide, N-vinyl imidazole, N-vinyl-N-methylacetamide, N-vinyl caprolactam, diethyleneglycol vinylether, tetraethyleneglycol vinylether, diacetone acrylamide, sodium 2-acrylamide-2-methyl-1-propane sulfonate, and others.

One or more surfactants can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the composition may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; LEG-1, and sodium dodecylsulfate.

Various other additives can be employed to optimize the properties of the UV-curable ink composition for specific applications. Examples of these additives are those added to inhibit the growth of harmful microorganisms. These additives may be biocides, fungicides, and other microbial agents. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), or a combination thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used if present. Viscosity modifiers and buffers may also be present, as well as other additives to modify properties of the ink as desired. Such additives can be present at from 0.01 wt % to 20 wt % if present.

The UV-curable ink composition can be used to print on a broad selection of substrates including untreated plastics, flexible as well as rigid, porous substrates such as paper, cardboard, foam board, textile, and others. The composition can have a good adhesion on a variety of substrates. The composition can also have a good viscosity, enabling good printing performance in inkjet printing. In some examples, the UV-curable ink composition can be formulated for thermal inkjet printing.

The reactive polyurethane dispersions described herein can be formed by reacting appropriate monomers in an appropriate reaction sequence to form the polymer backbone and the capping units. In one example, a method of making the reactive polyurethane dispersion can include reacting a diisocyanate with a reactive diol to form a first pre-polymer. The reactive diol can be an acrylate-containing diol, a methacrylate-containing diol, a styrene-containing diol, or a combination thereof. The first pre-polymer can then be reacted with a styrene-containing monoalcohol to form a second pre-polymer. The second pre-polymer can be reacted with an acid-containing amine to form a polymer strand. The polymer strand can then be dispersed in water to form the reactive polyurethane dispersion.

In one example, a polymer strand of the reactive polyurethane dispersion can be formed by following the reaction scheme shown in FIG. 1. A diisocyanate 1 and reactive diol 2 can react to form a first pre-polymer 3. In these steps, $R_2$ is an organic group and $R_3$ is an organic group containing an acrylate, methacrylate, or styrene functional group. In a certain example, the diisocyanate and reactive diol can be reacted with excess diisocyanate so that each polymer strand is likely to have a polymerized diisocyanate at each end. Thus, the first pre-polymer can have an unreacted isocyanate group available at each end.

The first pre-polymer 3 can react with a styrene-containing monoalcohol 4 to form a second pre-polymer 5. $R_1$ represents an organic group including a styrene group. The styrene-containing monoalcohol or monoamine can polymerize with one of the isocyanate groups at one end of the first pre-polymer. Specifically, the oxygen atom of the hydroxyl group of the styrene-containing monoalcohol can bond to the carbon atom of the isocyanate group. The hydrogen atom of the hydroxyl group becomes bonded to the nitrogen atom in the isocyanate group when this reaction occurs. Thus, one end of the first pre-polymer can be capped with a styrene-containing capping unit to form the second pre-polymer.

The second pre-polymer 5 can react with an acid-containing amine 6 such as an amino acid or taurine to form the final polymer strand 7. $R_4$ represents an organic group including an acidic group. $R_5$ can be hydrogen or an additional organic group. The nitrogen atom of the acid-containing amine can bond to the carbon atom of the isocyanate group. The hydrogen atom of the amine group becomes bonded to the nitrogen atom in the isocyanate group when this reaction occurs. Thus, the remaining end of the pre-polymer can be capped with an acid-containing amine.

Figure 2:
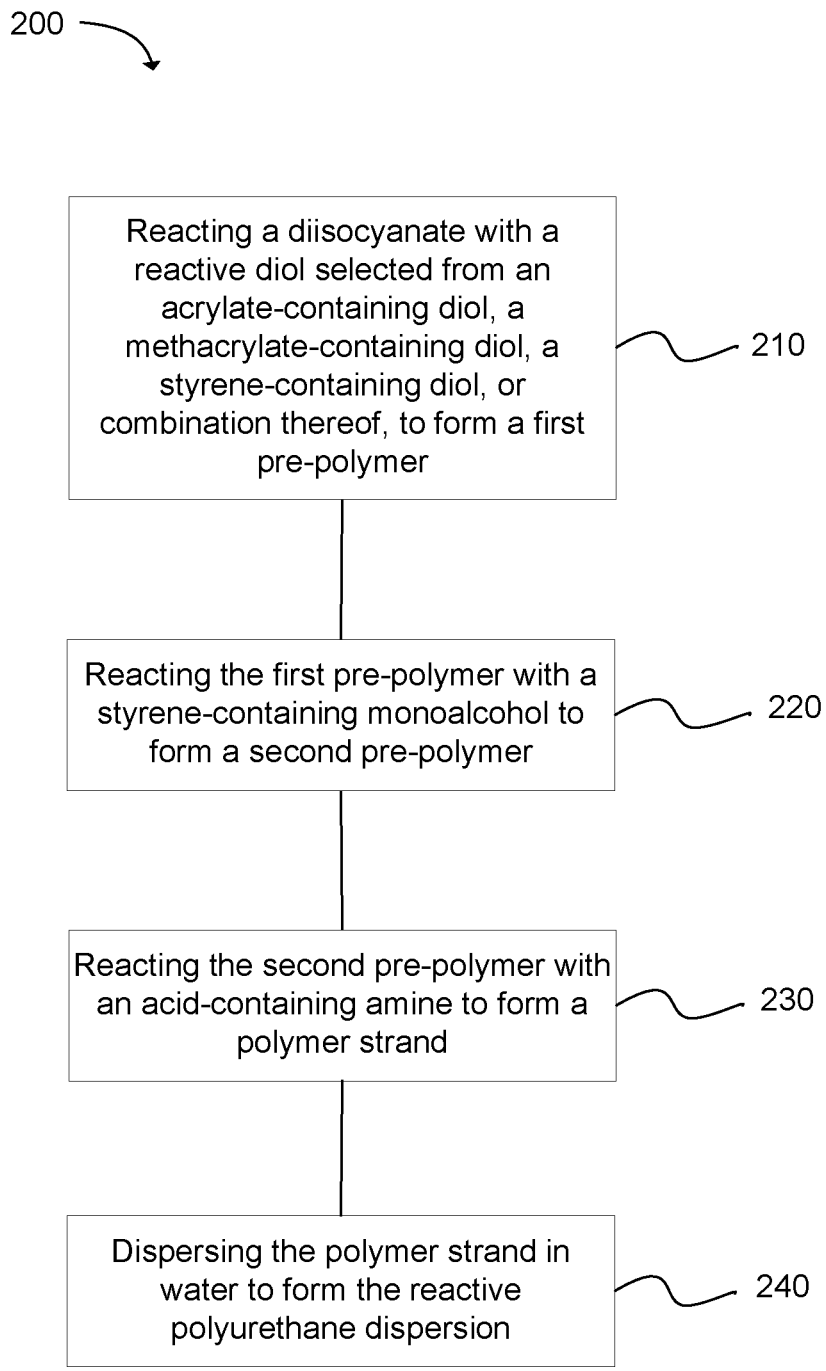
FIG. 2 is a flowchart of an example method of making a reactive polyurethane dispersion in accordance with the present disclosure.

FIG. 2 is a flowchart of another example of a method 200 of making a reactive polyurethane dispersion. The method includes reacting a diisocyanate with a reactive diol selected from an acrylate-containing diol, a methacrylate-containing diol, a styrene-containing diol, or combination thereof, to form a first pre-polymer 210; reacting the first pre-polymer with a styrene-containing monoalcohol to form a second pre-polymer 220; reacting the second pre-polymer with an acid-containing amine to form a polymer strand 230; and dispersing the polymer strand in water to form the reactive polyurethane dispersion 240.

In another example, a method of making a UV-curable ink composition can include making a reactive polyurethane dispersion as described above, and then adding a colorant and a photoinitiator to the reactive polyurethane dispersion to form the UV-curable ink composition. Other ingredients of the UV-curable ink composition can also be added as described above.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "UV-curable" refers to compositions that can be cured by exposure to ultraviolet light from any UV source such as a mercury vapor lamp, UV LED source, or the like. Mercury vapor lamps emit high intensity light at wavelengths from 240 nm to 270 nm and 350 nm to 380 nm. "LED curable" refers to compositions that can be cured either by ultraviolet light from an ultraviolet LED. Ultraviolet LEDs emit light at specific wavelengths. For example, ultraviolet LEDs are available at 365 nm and 395 nm wavelengths, among others.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific example, however, the pigment is a pigment colorant.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Synthesis of 3-[di-(4-vinylbenzyl) amino]-1,2-propanediol (VBAP)

VBAP was synthesized using the following procedure. To a solution of 4-vinylbenzyl chloride (91.6 g, 0.6 mol) and 3-amino-1,2-propanediol (27.3 g, 0.3 mol) in 300 ml of acetonitrile was added 4-methoxyphenol (MEHQ) (0.5 g) and potassium carbonate (82.9 g, 0.6 mol). The resulting mixture was allowed to reflux in the air for 24 hours. After cooling down to room temperature, the solid was filtered off and washed with ethyl acetate (2×100 mL). The solvent was removed to give a residue, which was purified by flash chromatography, eluting with hexanes, hexane/ethyl acetate (9/1 to 4/1), giving the desired product 3-[di-(4-vinylbenzyl) amino]-1,2-propanediol (VBAP) (87.3 g, 90% yield).

Example 2—Synthesis of 2-[di-(4-vinylbenzyl) amino-2-methylpropane-1,3-diol (VAMPB)

VAMPB was synthesized using the following procedure. To a solution of 4-vinylbenzyl chloride (91.6 g, 0.6 mol) and 2-amino-2-methyl-1,3-propanediol (31.5 g, 0.3 mol) in 300 ml of acetonitrile was added MEHQ (0.5 g) and potassium carbonate (82.9 g, 0.6 mol). The resulting mixture was allowed to reflux in the air for 24 hours. After cooling down to room temperature, the solid was filtered off and washed with ethyl acetate (2×100 mL). The solvent was removed to give a residue, which was purified by flash chromatography, eluting with hexanes, hexane/ethyl acetate (9/1 to 4/1), giving the desired product 2-[di-(4-vinylbenzyl)amino-2-methylpropane-1,3-diol (VAMPB) (83.0 g, 82% yield).

Example 3—Synthesis of 2-[di-(4-vinylbenzylamino)]ethanol (VBAE)

VBAE was synthesized using the following procedure. To a solution of 4-vinylbenzyl chloride (91.6 g, 0.6 mol) and ethanolamine (18.3 g, 0.3 mol) in 300 ml of acetonitrile was added MEHQ (0.5 g) and potassium carbonate (82.9 g, 0.6 mol). The resulting mixture was allowed to reflux in the air for 24 hours. After cooling down to room temperature, the solid was filtered off and washed with ethyl acetate (2×100 mL). The solvent was removed to give a residue, which was purified by flash chromatography, eluting with hexanes, hexane/ethyl acetate (9/1 to 4/1), giving the desired product 2-[di-(4-vinylbenzylamino)]ethanol (VBAE) (76.6 g, 87% yield).

Example 4—Synthesis of 3-[di-(4-vinylbenzylamino)]propanol (DVBAP)

DVBAP was synthesized using the following procedure. To a solution of 4-vinylbenzyl chloride (91.6 g, 0.6 mol) and 3-aminopropanol (22.5 g, 0.3 mol) in 300 ml of acetonitrile was added MEHQ (0.5 g) and potassium carbonate (82.9 g, 0.6 mol). The resulting mixture was allowed to reflux in the air for 24 hours. After cooling down to room temperature, the solid was filtered off and washed with ethyl acetate (2×100 mL). The solvent was removed to give a residue, which was purified by flash chromatography, eluting with hexanes, hexane/ethyl acetate (9/1 to 4/1), giving the desired product 3-[di-(4-vinylbenzylamino)]propanol (DVBAP) (78.4 g, 85% yield).

Example 5—Synthesis of 1-[di-(4-vinylbenzylamino)]-2-propanol (1-VBAP)

1-VBAP was synthesized using the following procedure. To a solution of 4-vinylbenzyl chloride (91.6 g, 0.6 mol) and 1-amino-2-propanol (22.5 g, 0.3 mol) in 300 ml of acetonitrile was added MEHQ (0.5 g) and potassium carbonate (82.9 g, 0.6 mol). The resulting mixture was allowed to reflux in the air for 24 hours. After cooling down to room temperature, the solid was filtered off and washed with ethyl acetate (2×100 mL). The solvent was removed to give a residue, which was purified by flash chromatography, eluting with hexanes, hexane/ethyl acetate (9/1 to 4/1), giving the desired product 1-[di-(4-vinylbenzylamino)]-2-propanol (1-VBAP) (73.8 g, 80% yield).

Example 6—Synthesis of PUD 9

A reactive polyurethane dispersion (PUD 9) was synthesized using the following procedure. 11.064 g of Bisphenol A glycerolate (1 glycerol/phenol) diacrylate (BGDA), 11.415 g of UD50 (a commercially available polycarbonate-based diol available from UBE America, Inc.), 0.225 g of MEHQ, 41.906 g of 4,4'-methylene dicyclohexyl diisocyanate (H12MDI), and 42 g of acetone were mixed in a 500 ml 4-neck round bottom flask. A mechanical stirrer with glass rod and Teflon blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hrs at 60° C. A 0.5 g sample was withdrawn for wt % NCO titration to confirm the reaction. The measured NCO value was 13.02 wt %. Theoretical wt % NCO was 13.13 wt %. 31.582 g of DVBAP, 0.316 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. 0.5 g of pre-polymer was withdrawn for final wt % NCO titration. The measured NCO value was 3.65 wt %. The theoretical wt % NCO was 3.73 wt %. The polymerization temperature was reduced to 40° C. 10.001 g of taurine, 6.712 g of 50 wt % NaOH, and 60.003 g of deionized water were mixed in a beaker until the taurine was completely dissolved. The taurine solution was added to the pre-polymer solution at 40° C. with vigorous stirring over 1-3 mins. The solution became viscous and slightly hazy. Stirring continued for 30 mins at 40° C. The mixture became clear and viscous after 15-20 mins at 40° C. 200.856 g of cold deionized water was added to the polymer mixture in the 4-neck round bottom flask over 1-3 mins with good agitation to form a PUD dispersion. The agitation was continued for 60 mins at 40° C. The PUD dispersion was filtered through a 400 mesh stainless sieve. Acetone was removed with rotorvap at 50° C. (adding 2 drops (20 mg) BYK-011 de-foaming agent if there was excessive foaming). The final PUD dispersion was filtered through fiber glass filter paper. Particle size measured by Malvern Zetasizer was 24 nm. The pH was 7.5. Solid content was 30.05 wt %. This PUD showed less than 0.4 unit pH drop after 1 week ASL.

Example 7—Compositions of Additional PUDs

The reactive polyurethane dispersion of Example 6 and a series of additional reactive polyurethane dispersions were synthesized using procedures similar to the procedure described above. The compositions of the reactive polyurethane dispersions are shown in Table 1.

TABLE 1

| PUD # | IPDI (wt %) | H12MDI (wt %) | BGDA (wt %) | Taurine (wt %) | UD100 (wt %) | GDAE (wt %) | VBAE (wt %) |
|---|---|---|---|---|---|---|---|
| 1 |  | 41.61 | 25.62 | 11.58 |  |  |  |
| 2 |  | 37.86 | 23.31 | 10.54 |  |  |  |
| 3 |  | 43.10 | 19.90 | 13.71 |  | 18.86 |  |
| 4 |  | 44.07 | 13.57 | 14.02 |  | 19.29 |  |
| 5 | 39.09 |  | 21.31 | 14.67 |  | 20.19 |  |
| 6 | 40.04 |  | 14.55 | 15.03 |  | 20.68 |  |
| 7 | 31.17 |  | 11.33 | 11.70 | 23.37 | 8.05 |  |
| 8 |  | 34.84 | 10.72 | 11.08 | 22.13 | 7.62 |  |
| 9 |  | 35.94 | 11.06 | 10.00 |  |  |  |
| 10 |  | 36.33 |  | 10.11 |  |  | 23.08 |
| 11 |  | 35.10 | 10.80 | 6.98 |  |  | 35.98 |
| 12 |  | 35.94 | 11.06 | 10.00 |  |  |  |

| PUD # | VBOE (wt %) | DVBAE (wt %) | DVPD (wt %) | DVP (wt %) | DVBAP (wt %) | UD50 (wt %) | 1-VBAP (wt %) |
|---|---|---|---|---|---|---|---|
| 1 | 21.20 |  |  |  |  |  |  |
| 2 | 5.36 | 22.94 |  |  |  |  |  |
| 3 |  |  | 4.43 |  |  |  |  |
| 4 |  |  | 9.06 |  |  |  |  |
| 5 |  |  | 4.74 |  |  |  |  |
| 6 |  |  | 9.71 |  |  |  |  |
| 7 |  |  |  | 14.37 |  |  |  |
| 8 |  |  |  | 13.61 |  |  |  |
| 9 |  |  |  |  | 31.58 | 11.42 |  |
| 10 |  |  |  |  |  | 23.08 |  |
| 11 |  |  |  |  |  | 11.15 |  |
| 12 |  |  |  |  |  | 11.42 | 31.584 |

In Table 1, PUD # is the number designating the reactive polyurethane dispersion. The remaining columns show the weight percent of each monomer, based on the total weight of monomers reacted to form the polyurethane dispersion.

UD50 and UD100 are commercially available diols available from UBE America, Inc.

Several properties of these reactive polyurethane dispersions are shown in Table 2.

TABLE 2

| PUD # | Particle Size (nm) | Acid Number | Double Bond Density | pH | NCO/OH Ratio |
|---|---|---|---|---|---|
| 1 | 99.55 | 51.9 | 2.2 | 7.5 | 3.00 |
| 2 | 29.79 | 47.2 | 2.8 | 8.5 | 3.00 |
| 3 | 18.16 | 61.5 | 3.3 | 7.5 | 3.00 |
| 4 | 17.52 | 62.8 | 3.4 | 7.5 | 3.00 |
| 5 | 13.69 | 65.8 | 3.5 | 7.0 | 3.00 |
| 6 | 28.57 | 67.4 | 3.6 | 8.5 | 3.00 |
| 7 | 13.09 | 52.5 | 3.2 | 7.5 | 3.00 |
| 8 | 19.56 | 49.7 | 3.0 | 7.5 | 3.00 |
| 9 | 23.94 | 44.8 | 2.9 | 8.5 | 3.00 |
| 10 | 39.32 | 45.3 | 2.9 | 9.0 | 3.00 |
| 11 | 122.3 | 31.3 | 3.3 | 7.8 | 3.00 |
| 12 | 32.07 | 44.8 | 2.9 | 7.5 | 3.00 |

In Table 2, particle size refers to the average diameter of the particles in nanometers. Acid number, double bond density, and NCO/OH ratio are as defined above.

Example 8—UV-Curable Ink Compositions

UV-curable ink compositions were formed using the reactive polyurethane dispersions shown in Tables 1-2. The UV-curable ink compositions each had the following composition: 10.00 wt % reactive polyurethane dispersion; 0.80 wt % Surfynol® CT-211 (Air Products); 0.50 wt % DX-4000™ (Dynax); 0.50 wt % sodium phenyl-(2,4,6-trimethylbenzoyl)phosphinate (TPA Na); 0.25 wt % 2-Methoxypolyethyleneglycol-9H-Thioxanthen-9-one (M-TX-PEG-550); 4.00 wt % magenta pigment; balance water. Each ink was printed using an inkjet printer at a rate of 100 ft/min and cured under UV LED light at 25 ft/min. The ink films were subjected to the following tests: a) Eraser Rub: rub with a pencil eraser 10 times with 250 g of weight applied; b) Windex Rub: rub with Crockmeter Test Cloth and Windex® cleaning solution 5 times with 250 g of weight applied; c) Wet Rub: rub once with Crockmeter Test Cloth and water with no applied weight; d) 70 vol % IPA Rub: rub with Crockmeter Test Cloth and 70 vol % isopropyl alcohol with 250 g of weight applied; e) Tape Adhesion: apply Scotch® tape and then remove; f) Sutherland® Rub Test: On a Sutherland® Rub Tester, heat to 350° F., rub 10 times with 4 psi at speed 2. All of the rub tests except for Sutherland® Rub Test are scored from 0.0 to 5.0 with 0.0 being the best score and 5.0 being the worst score. The Sutherland® Rub Test is scored from 1.0 to 5.0 with 5.0 being the best score and 1.0 being the worst score. The durability results are reported in Table 3 below. Table 3 also shows ASL stability and durability of magenta inks based on these curable styrene based PUDs. All of these styrene based curable PUDs have excellent pH stability and ASL particle size and viscosity stability. Additionally, a majority of these magenta inks based on styrene capped PUDs have excellent wet rub, Sutherland durability and excellent tape adhesion. A majority of these magenta inks demonstrated generally good Eraser durability. Several magenta inks showed good Windex and IPA durability such as PUD 9, PUD 11, and PUD 12.

TABLE 3

| PUD # | Optical Density | 75° Gloss | Eraser Rub | Windex Rub | 70 vol % IPA | Wet Rub |
|---|---|---|---|---|---|---|
| 1 | 1.50 | 83 | 2.0 | 4.0 | 5.0 | 0.0 |
| 2 | 1.51 | 85 | 2.0 | 3.0 | 4.0 | 0.0 |
| 3 | 1.84 | 91 | 2.0 | 4.0 | 5.0 | 1.0 |
| 4 | 1.89 | 91 | 3.0 | 5.0 | 5.0 | 2.5 |
| 5 | 1.9 | 90 | 3.5 | 5.0 | 5.0 | 3.5 |
| 6 | 1.85 | 89 | 4.0 | 5.0 | 5.0 | 4.0 |
| 7 | 1.72 | 84 | 3.0 | 4.0 | 4.5 | 0.5 |
| 8 | 1.80 | 84 | 3.5 | 5.0 | 5.0 | 0.0 |
| 9 | 1.40 | 74 | 3.5 | 2.0 | 4.0 | 0.5 |
| 10 | 1.41 | 82 | 3.0 | 3.5 | 5.0 | 0.0 |
| 11 | 1.38 | 70 | 2.5 | 2.0 | 3.5 | 0.0 |
| 12 | 1.26 | 71 | 3.0 | 1.0 | 4.0 | 0.0 |

| PUD # | Tape Adhesion | Sutherland | Delta pH | % Change Viscosity | % Change Mv | % Change D95 |
|---|---|---|---|---|---|---|
| 1 | 0.0 | 5.0 | −0.23 | 0.4 | 1.3 | 0.8 |
| 2 | 0.0 | 5.0 | 0.30 | 0.2 | 2.4 | 1.2 |
| 3 | 0.0 | 5.0 | 0.25 | −2.0 | 4.0 | 4.0 |
| 4 | 0.0 | 5.0 | 0.30 | 0.0 | 3.0 | 5.0 |
| 5 | 0.0 | 5.0 | 0.15 | 3.0 | 5.0 | 6.0 |
| 6 | 0.0 | 5.0 | 0.26 | 2.0 | 6.0 | 9.0 |
| 7 | 0.0 | 5.0 | 0.26 | 2.0 | 5.0 | 5.0 |
| 8 | 4.0 | 2.0 | 0.18 | 4.0 | 3.0 | 7.0 |
| 9 | 0.0 | 5.0 | 0.27 | −5 | 1 | 2 |
| 10 | 0.0 | 5.0 | 0.32 | 0 | −2 | 1 |
| 11 | 0.0 | 5.0 | 0.18 | 0 | 2 | −8 |
| 12 | 0.0 | 4.0 | 0.25 | 10 | 10 | 8 |

Example 9—UV-Curable Ink Compositions with Cross-Linkers

The UV-curable ink composition including PUD 9 was tested for durability and compared to the same ink composition with an added cross-linker, Jeffamine® 900 diacrylamide (JA-900-DA). The ink compositions were drawn-down on plastic media and the above-mentioned rub tests were performed. Paper clip test was also performed by scratching the ink surface with a paper clip. Table 4 shows the durability test results of these ink compositions.

TABLE 4

| Ink Ingredients | Eraser Rub | Windex Rub | 70 vol % IPA Rub | Wet Rub | Paper Clip |
|---|---|---|---|---|---|
| PUD 9 | 4 | 4 | 4 | 4 | 5 |
| PUD 9 with 7 wt % JA-900-DA | 1.5 | 1 | 2 | 1 | 2 |
| PUD 9 with 5 wt % JA-900-DA | 3 | 2.5 | 3 | 1 | 3 |

From Table 4, a trend can be observed of improvement of durability including Windex and IPA durability across the board with the addition of curable cross-linker JA-900-DA. The ink film with curable PUD 9 only failed all of the tests, while adding 5 wt % of JA-900-DA improved the durability across the board, especially for the water rub. With 7 wt % of JA-900-DA added, all of the durability tests, including the 70 vol % IPA and paper clip tests, passed the threshold.

Table 5 shows the ASL stability of viscosity, particle size, and pH of these ink compositions and an ink composition including a commercially available curable monomer in place of the reactive PUD. The commercially available curable monomer was available from Sartomer. Table 5 clearly demonstrates the compatibility of JA-900-DA with other ingredients of the UV-curable ink compositions. The ink containing PUD 9 has excellent ASL stability including viscosity, particle size and pH stability. While adding 5 wt % or 7 wt % of JA-900-DA, the stability of the inks is slightly decreased but still within acceptable range. While the ink containing commercial monomer from Sartomer had very poor ASL stability, especially particle size and pH drop.

TABLE 5

| Ink Ingredients | % Change Viscosity | % Change Particle Size | pH Drop |
|---|---|---|---|
| PUD 9 | 0.16 | 5.8 | 0.11 |
| PUD 9 with 7 wt % JA-900-DA | 7.65 | 9.16 | 0.52 |
| PUD 9 with 5 wt % JA-900-DA | 3.04 | 3.97 | 0.49 |
| Sartomer monomer in place of PUD 9 | −9.65 | −17.61 | 0.9 |

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A reactive polyurethane dispersion, comprising a polymer strand comprising a polymer backbone having two terminating ends comprising a first capping unit at a first terminating end and a second capping unit at a second terminating end, wherein the polymer backbone comprises polymerized monomers including:
   a reactive diol selected from an acrylate-containing diol, a methacrylate-containing diol, a styrene-containing diol, or combination thereof, and
   a diisocyanate;
   wherein the first capping unit is a styrene-containing monoalcohol reacted with an isocyanate group of the diisocyanate; and
   wherein the second capping unit is an ionic stabilizing group.

2. The reactive polyurethane dispersion of claim 1, wherein the polymer backbone is devoid of ionic stabilizing groups.

3. The reactive polyurethane dispersion of claim 1, wherein the reactive polyurethane dispersion has a NCO/OH ratio of 1.2 to 10.

4. The reactive polyurethane dispersion of claim 1, wherein the reactive polyurethane dispersion has an acid number of 20 to 100.

5. The reactive polyurethane dispersion of claim 1, wherein the reactive polyurethane dispersion has a double bond density of 1.5 to 10.

6. The reactive polyurethane dispersion of claim 1, wherein the reactive diol is selected from:

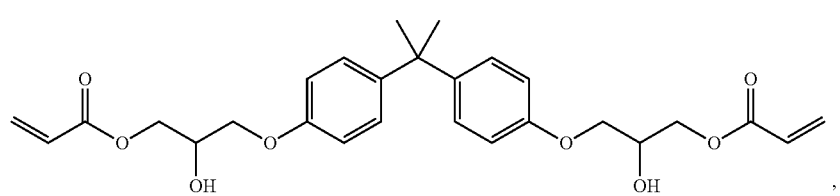

(IV)

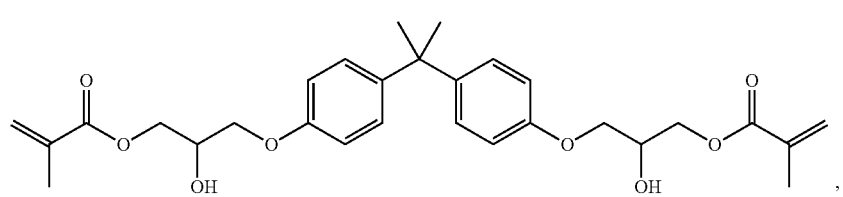

(V)

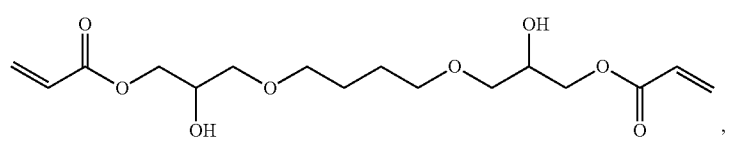

(VI)

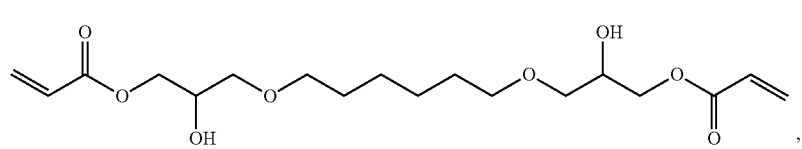

(VII)

(VIII) 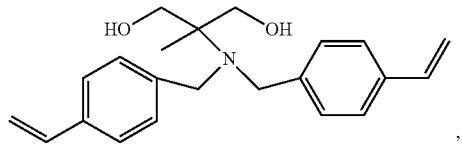

(IX) 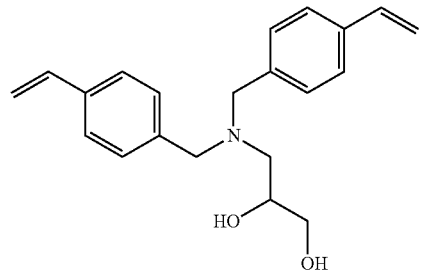

or a combination thereof.

7. The reactive polyurethane dispersion of claim 1, wherein the styrene-containing monoalcohol is selected from:

(XVI) 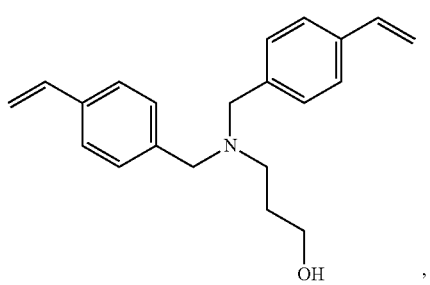

(XVII) 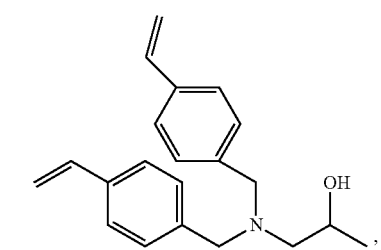

(XVIII) 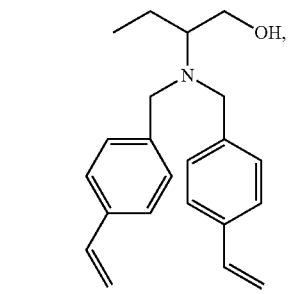

(XIX)
(XX) 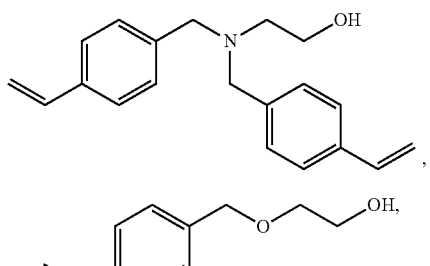

or a combination thereof.

8. The reactive polyurethane dispersion of claim 1, wherein the reactive polyurethane dispersion is devoid of polymer strands having capping units that include acrylate groups or methacrylate groups.

9. The reactive polyurethane dispersion of claim 1, wherein a majority of polymer strands in the reactive polyurethane dispersion have a first capping unit that is a styrene-containing monoalcohol reacted with an isocyanate group of the diisocyanate and a second capping unit that is an ionic stabilizing group.

10. A UV-curable ink composition, comprising:
a colorant;
a photoinitiator; and
a reactive polyurethane dispersion, comprising a polymer strand comprising a polymer backbone having two terminating ends comprising a first capping unit at a first terminating end and a second capping unit at a second terminating end, wherein the polymer backbone comprises polymerized monomers including:
a reactive diol selected from an acrylate-containing diol, a methacrylate-containing diol, a styrene-containing diol, or combination thereof, and
a diisocyanate;
wherein the first capping unit is a styrene-containing monoalcohol reacted with an isocyanate group of the diisocyanate; and
wherein the second capping unit is an ionic stabilizing group.

11. The UV-curable ink composition of claim 10, wherein the UV-curable ink composition has a pH of 7.0 to 11.5.

12. The UV-curable ink composition of claim 11, wherein the pH does not decrease by more than 1.0 when the UV-curable ink composition is exposed to accelerated shelf life (ASL) at 50° C. in open air for 1 week.

13. The UV-curable ink composition of claim 10, wherein the polymer backbone is devoid of ionic stabilizing groups.

14. A method of making a reactive polyurethane dispersion, comprising:
reacting a diisocyanate with a reactive diol selected from an acrylate-containing diol, a methacrylate-containing diol, a styrene-containing diol, or combination thereof, to form a first pre-polymer;
reacting the first pre-polymer with a styrene-containing monoalcohol to form a second pre-polymer;
reacting the second pre-polymer with an acid-containing amine to form a polymer strand; and
dispersing the polymer strand in water to form the reactive polyurethane dispersion.

15. The method of claim 14, further comprising adding a colorant and a photoinitiator to the reactive polyurethane dispersion to form a UV-curable ink composition.

16. The method of claim 15, further comprising adding a cross-linker to the UV-curable ink composition.

17. The method of claim 14, wherein the styrene-containing monoalcohol is selected from:

(XVI)
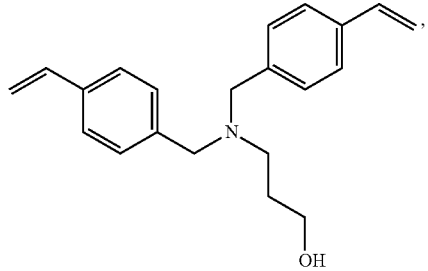

(XVII)
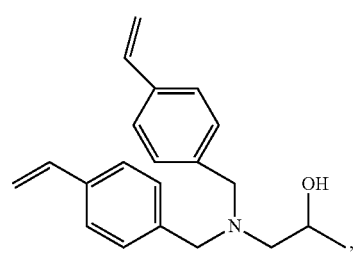

(XVIII)
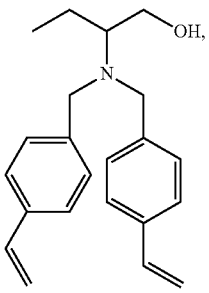

(XIX)
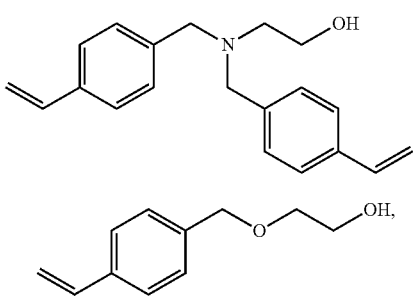

(XX)
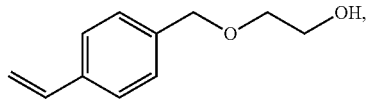

or a combination thereof.

18. The UV-curable ink composition of claim 10, further comprising a cross-linker.

19. The UV-curable ink composition of claim 10, wherein the reactive diol is selected from:

(IV)
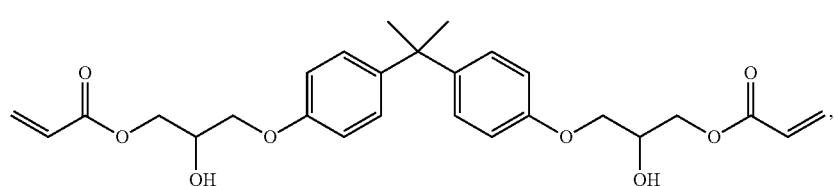

(V)
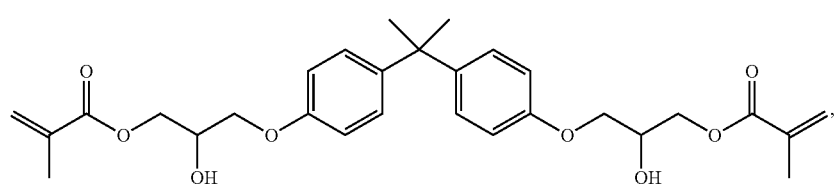

(VI)
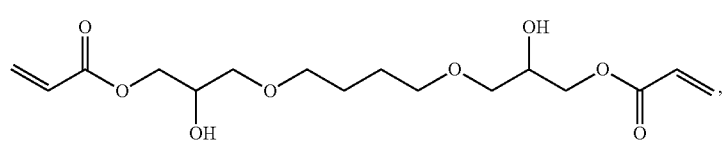

(VII)
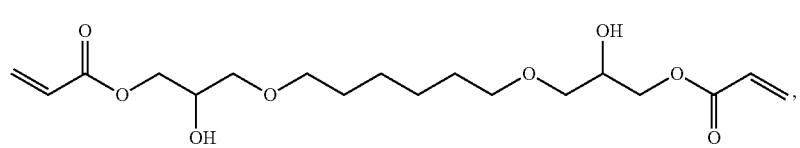

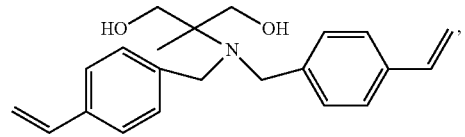
(VIII)
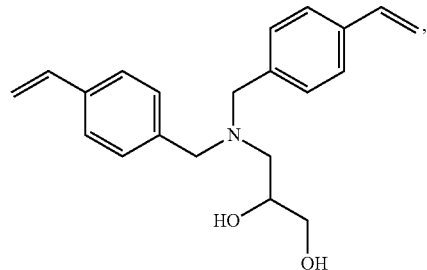
(IX)
or a combination thereof.
20. The UV-curable ink composition of claim 10, wherein the styrene-containing monoalcohol is selected from:
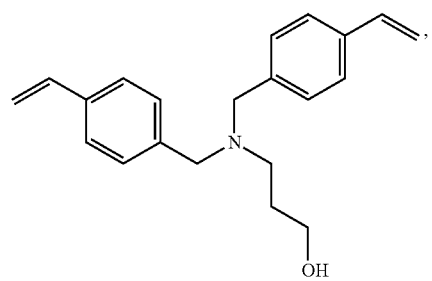
(XVI)
(XVII)
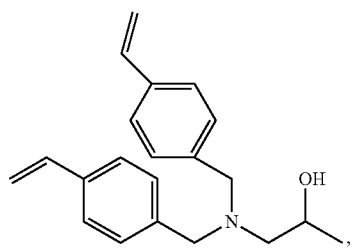
-continued
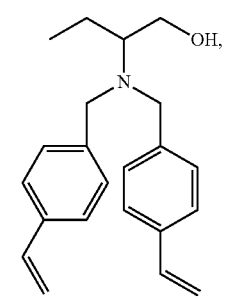
(XVIII)
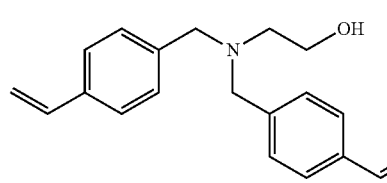
(XIX)
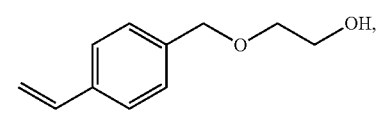
(XX)
or a combination thereof.
* * * * *